United States Patent
Hicks et al.

(10) Patent No.: US 6,885,816 B1
(45) Date of Patent: Apr. 26, 2005

(54) WATER HEATER APPARATUS AND ASSOCIATED MANUFACTURING AND INSULATION METHODS

(75) Inventors: Kenneth J. Hicks, Deatsville, AL (US); David L. Henderson, Millbrook, AL (US); Jozef Boros, Montgomery, AL (US)

(73) Assignee: Rheem Manufacturing Company, New York, NY (US)

( * ) Notice: Subject to any disclaimer, the term of this patent is extended or adjusted under 35 U.S.C. 154(b) by 57 days.

(21) Appl. No.: 10/701,959

(22) Filed: Nov. 3, 2003

(51) Int. Cl.$^7$ ................................................ F24H 1/20
(52) U.S. Cl. ...................... 392/451; 392/441; 264/45.2; 122/19.2
(58) Field of Search ................................ 392/441, 447, 392/451; 122/494, 19.2, 344; 264/46.9, 45.2

(56) References Cited

U.S. PATENT DOCUMENTS

| | | | |
|---|---|---|---|
| 4,372,028 A | 2/1983 | Clark et al. ................... 29/460 |
| 4,447,377 A | 5/1984 | Denton ....................... 264/45.2 |
| 4,632,792 A | 12/1986 | Clark ......................... 264/45.2 |
| 4,687,118 A | 8/1987 | Clark ........................... 220/444 |
| 4,744,488 A | 5/1988 | Nelson ........................ 220/444 |
| 5,052,346 A | 10/1991 | Beck ............................ 122/494 |
| RE33,968 E | 6/1992 | Clark ........................... 220/444 |
| 5,163,119 A | 11/1992 | Windon ........................ 392/449 |
| 5,263,469 A | 11/1993 | Hickman ...................... 126/344 |
| 5,474,202 A | 12/1995 | Moore, Jr. .................... 220/444 |

Primary Examiner—Thor Campbell
(74) Attorney, Agent, or Firm—Konneker & Smith, P.C.

(57) ABSTRACT

A foam dam in the insulation cavity of an electric water heater comprises a plastic bag into which liquid foam insulation is injected, the bag having an essentially closed top edge portion with only a small opening for receiving the injected insulation. A small portion of the insulation injected into the bag is forced outwardly therefrom via small metering holes to form external protrusions on the bag that mechanically interlock with a second batch of insulation subsequently injected into the cavity and prevent the hardened second insulation batch from pulling away from the bag. The substantially closed top edge of the bag permits the insulation injected into the bag to pack therein and increase the top-to-bottom hardened foam density uniformity. Side edges of the bag may be pleated to increase the sealing area of the foam dam.

43 Claims, 3 Drawing Sheets

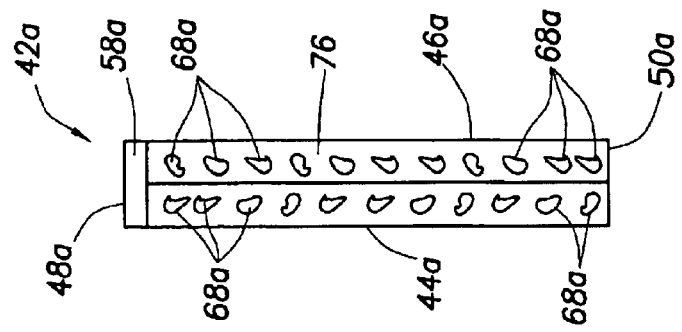
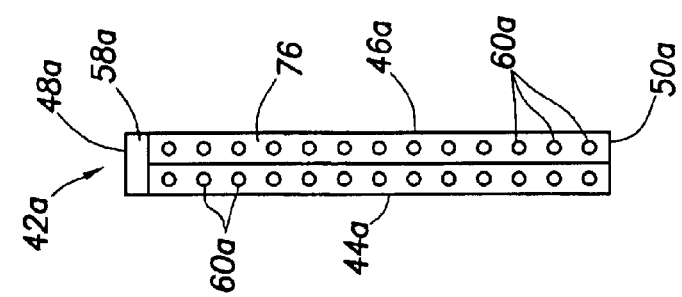
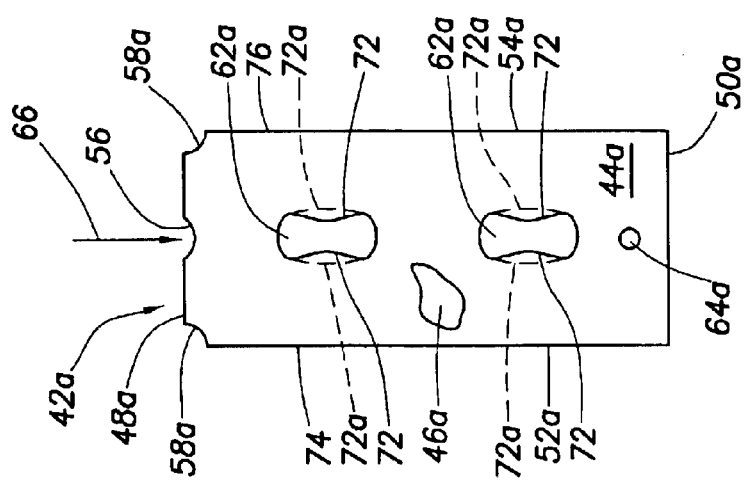
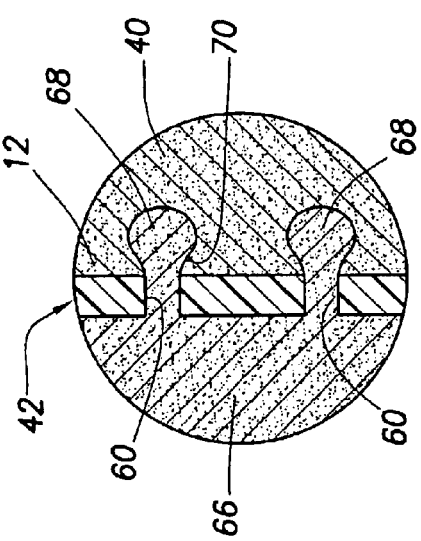

WATER HEATER APPARATUS AND ASSOCIATED MANUFACTURING AND INSULATION METHODS

BACKGROUND OF THE INVENTION

The present invention generally relates to the manufacture of insulated structures and, in a preferred embodiment thereof, more particularly relates to water heater structures and associated manufacturing and insulation methods therefor.

A conventional water heater of either the electric or fuel-fired type normally comprises a water storage tank, typically of a metal construction, adapted to hold a quantity of pressurized, heated water for on-demand delivery to various plumbing fixtures such as sinks, tubs, showers, dishwashers or the like. Outwardly surrounding the tank is a jacket, typically of a metal construction, which defines around the tank a cavity which is filled with a suitable insulation material, usually a hardened foam insulation material which is initially injected into the cavity in liquid form during the fabrication of the water heater. Various control structures, such as thermostats and electric heating element structures project outwardly from the tank and are aligned with associated access openings in the jacket.

In order to shield these control structures from the insulation, and to prevent the insulation from being forced outwardly through the jacket access openings during the liquid insulation injection process, it is common practice to circumscribe the control structure areas within the tank/jacket cavity with insulation barriers commonly referred to as "foam dams". One previously proposed method of providing a foam dam around a control structure projecting outwardly from a water heater tank, illustrated and described in U.S. Pat. No. 4,372,028 to Clark et al, is to provide a plastic bag having a peripherally sealed aperture extending therethrough, place the bag in the empty tank/jacket cavity with the aperture aligned with and circumscribing the control structure location, expanding the bag into sealing engagement with the tank and jacket by injecting foam insulation into the bag, and then permitting the injected foam to harden within the bag.

The empty remainder of the insulation cavity is then injected with additional liquid foam insulation which is prevented from encroaching into the control structure locations, or flowing outwardly through the associated jacket access openings, by the previously formed plastic bag-based foam dam. This second batch of injected liquid foam insulation contacts the periphery of the foam dam and hardens within the tank/jacket cavity to complete the tank insulation process.

Several well known problems, limitations and disadvantages are typically associated with this conventional plastic bag-based foam dam construction. First, after the second or main batch of foamed-in insulation hardens it tends to pull away from the plastic bag in a manner creating a gap between the second foam batch and the bag along the entire length of the water heater. This gap, caused by shrinkage of the second foam batch, undesirably permits appreciable heat loss from the tank therethrough.

Second, the current practice for filling the foam bag with the first batch of foam insulation is to inject a shot of foam into the bag and then let the injected foam "free rise" within the bag to fill it. This results in an undesirably decreased foam density in a top portion of the bag, resulting in a lesser insulation efficiency in the top portion of the bag.

Third, bags of this conventional type are typically of a flat construction, but are used to sealingly fill a three dimensional portion of the tank/jack insulation cavity. The result tends to be a filled bag with marginal foam coverage around the control or other structure around which the filled foam bag protectively extends.

As can readily be seen from the foregoing, a need exists for an improved plastic bag-based foam dam structure and related insulated tank apparatus and associated fabrication methods. It is to this need that the present invention is directed.

SUMMARY OF THE INVENTION

In carrying out principles of the present invention, in accordance with a preferred embodiment thereof, a method of insulating a tank, such as a water heater tank, is carried out by steps including placing an outer jacket on the tank to define a cavity extending outwardly around a portion of the tank, and positioning a flexible bag in a first portion of the cavity, the bag having a spaced series of metering openings in a wall portion thereof. A first quantity of flowable, hardenable insulation is forced into the bag in a manner expanding the bag into sealing engagement with the tank and outer jacket, and causing a small portion of the insulation to be forced outwardly through the metering openings and subsequently form spaced apart hardened external protrusions on the bag. Representatively, the bag is of a plastic material, and the insulation material is a liquid foam insulating material.

After the first insulation quantity has hardened, a second quantity of flowable, hardenable insulation, preferably a liquid foam insulation, is flowed into a second portion of the cavity and into contact with the wall portion of the bag and the hardened insulation protrusions thereon. The second insulation quantity is permitted to harden and become mechanically interlocked with the previously hardened insulation protrusions in a manner substantially preventing shrinkage-created separation of the second insulation quantity from the wall portion of the bag. In this manner, in the finished insulated tank apparatus which also embodies principles of the present invention, there is no appreciable heat loss gap or void between the second batch of insulation and the foam filled bag.

Illustratively, the locking insulation protrusions have generally knob-like configurations which have surfaces that are spaced outwardly apart from and generally face the bag. These protrusion surfaces abut facing portions of the hardened second insulation quantity to facilitate the mechanical interlock between the hardened protrusions and the hardened second insulation quantity within the tank/jacket cavity.

In accordance with another aspect of the present invention, the bag has an essentially closed upper end with a relatively small inlet opening therein through which the first insulation quantity is injected into the bag. Small insulation vent openings are formed in the bag adjacent this injection inlet opening. Because of this configurational aspect of the bag, insulation injected into the bag is pressure-packed into the bag, as opposed to being permitted to merely "free rise" therein. This results in a desirably increased hardened insulation density uniformity along the vertical dimension of the bag. According to a further aspect of the present invention, this vertical insulation density uniformity is additionally enhanced by arranging the metering openings vertically along opposite vertical side edge portions of the bag and configuring the metering openings in a manner such that their cross-sectional areas increase in an upward direction along such side edge portions of the bag.

In one embodiment of the present invention, principles thereof are representatively incorporated in an electric water heater in which a component, representatively a heating element thermostat, projects outwardly from the tank toward an opening in the outer jacket. The insulation-filled bag functions as a foam dam which sealingly engages facing portions of the tank and jacket that circumscribe the component. The component extends through a peripherally sealed opening in the bag. According to a feature of the invention, this opening has, prior to the expansion of the bag caused by injection of foam insulation into its interior, a generally hourglass-shaped configuration with concave opposite vertical side portions. When the bag is subsequently expanded by the foam injected into its interior, these concave opposite side portions are is caused to generally straighten so that this component-receiving bag opening is more nearly rectangular to more closely correspond in shape to the generally rectangular shape of the thermostat.

BRIEF DESCRIPTION OF THE DRAWINGS

FIG. 7 is an enlarged scale detail view of the dashed area "7" in FIG. 6;

FIG. 8 is an enlarged scale partially cut away front side elevational view of an alternate embodiment of the plastic foam bag in a flattened, pre-use orientation;

FIG. 9 is a right side edge view of the FIG. 8 bag in its generally flat pre-use orientation; and FIG. 9A is a right side edge view of the FIG. 8 bag after it has been filled and expanded with foam insulation.

DETAILED DESCRIPTION

Figure 1:
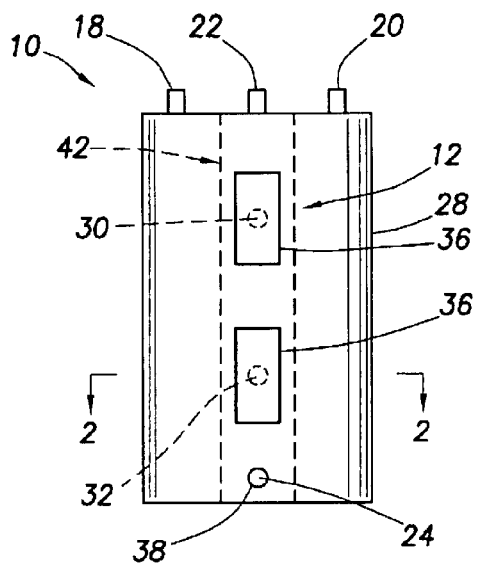
FIG. 1 is a schematic side elevational view of an electric water heater embodying principles of the present invention.
Figure 2:
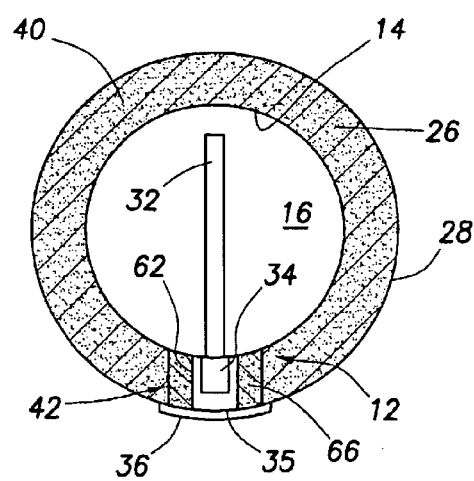
FIG. 2 is an enlarged scale schematic cross-sectional view through the water heater taken along line 2—2 of FIG. 1.

Referring initially to FIGS. 1 and 2, the present invention provides a water heater, representatively an electric water heater 10, which is constructed and insulated in a unique manner using a specially designed foam dam structure 12 (see FIG. 2) which will be subsequently described herein. Water heater 10 includes a vertically oriented, representatively cylindrical metal storage tank 14 adapted to hold a quantity of pressurized hot water 16 for on-demand delivery to various plumbing fixtures such as sinks, tubs, showers, dishwashers and the like. Extending upwardly from the upper end of the tank 14 are the usual cold water inlet, hot water outlet, and temperature and pressure relief fittings 18,20 and 22. On the side of the tank 12, near its bottom end, is an outwardly projecting drain fitting 24.

Outwardly circumscribing the tank 14, and forming therewith an insulation cavity 26, is a metal jacket of a suitable, conventional construction. To heat the water 16 within the tank 14, the water heater 10 is provided with heating apparatus representatively in the form of upper and lower electrical resistance type immersion heating elements 30,32 which project horizontally through the vertical side wall of the tank 14 into the water 16 therein. The outer ends of the heating elements 30,32 are secured to thermostatic control structures 34 that project outwardly from the tank 14, through the insulation cavity 26, and are aligned with access openings 35 in the jacket 28. The access openings 35 are covered with suitable removable cover panels 36 secured to the jacket 28, and the drain fitting 24 projects outwardly through a hole 38 in the jacket 28.

To substantially reduce undesirable heat loss from the tank 14 outwardly through the outer jacket 28, liquid foam insulation 40 is injected into the cavity 26 in a conventional manner and is allowed to harden in the cavity 26. In a manner subsequently described herein, prior to this foam insulation injection the foam dam structure 12 is installed in the insulation cavity 26 and functions to prevent the pressurized liquid foam insulation 40 being injected into the cavity 26 from contacting the thermostats 34 or being forced outwardly through either of the jacket access openings 35 or the drain fitting hole 38.

Figure 3:
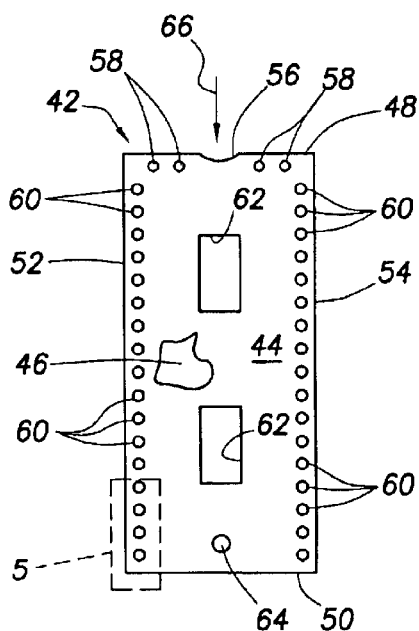
FIG. 3 is an enlarged scale, partially cut away front side elevational view of a specially configured plastic foam bag used in the fabrication of the water heater, the foam bag being in a flattened pre-use orientation.
Figures 4, 4A:
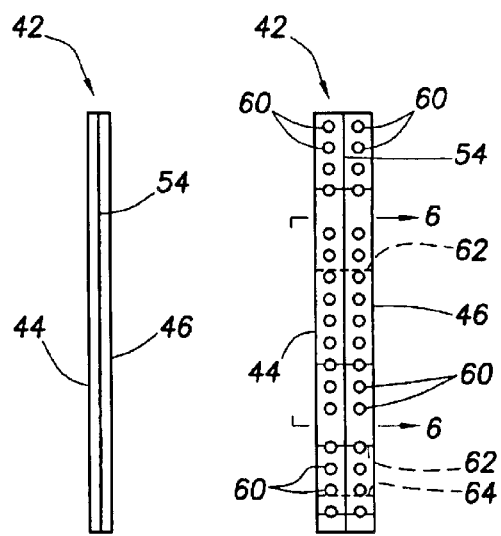
FIG. 4 is a right side edge view of the plastic foam bag.
FIG. 4A is a right side edge view of the plastic bag after it has been filled and expanded with foam insulation.

The foam dam structure 12 includes a vertically elongated, generally rectangular plastic bag 42 which is illustrated in FIGS. 3 and 4 in a flattened, pre-use orientation thereof. Bag 42 has front and rear side walls 44 and 46, top and bottom edges 48 and 50, and left and right vertical edges 52 and 54. Edges 50,52,54 of the bag 42 are sealed along their lengths, and the top edge 48 is substantially closed with the exception of a relatively small central insulation injection opening 56 formed therein. Horizontally spaced vent openings 58 are formed through the front and rear side walls 44,46 inwardly adjacent the top edge 48 on opposite sides of the injection opening 56, and vertically spaced series of what may be termed pinhole metering openings 60 extend through the front and rear side walls 44,46 inwardly adjacent the left and right edges 52,54. Representatively, metering openings 60 are arranged in single vertical rows inwardly adjacent the bag side edges 52 and 54, but other metering opening arrangements and patterns could be utilized if desired. Horizontally aligned, vertically spaced rectangular thermostat openings 62 extend through the front and rear bag side walls 44,46 above a circular drain fitting opening 64 also extending through the front and rear bag side walls 44,46. Each of the openings 62 and 64 has a sealed periphery.

To form the foam dam structure 12 within the insulation cavity 26, the still flattened plastic bag 42 is suitably secured against the outer side of the tank 14, before the outer jacket 28 is installed, with the thermostats 34 extending through the rectangular bag openings 62, and the top edge 48 of the bag 42 adjacent the top end of the tank 14. The outer jacket structure 28 is then installed in a manner aligning the jacket access openings 35 with the bag openings 62 and the jacket drain fitting opening 64 with the jacket drain fitting hole 38. The drain fitting 24 may then be operatively connected to the tank 14 through the jacket hole 38 and the bag opening 64.

Next, an initial quantity of liquid foam insulation 66 is injected downwardly into the bag 42 through its relatively small top edge opening 56. Because the top end edge 48 of the bag 42 is substantially closed except for this relatively small injection opening, the injected insulation 66 tends to be packed into the bag under pressure (as opposed to being simply being permitted to "free rise" within the bag) as it is being injected. When the bag 42 is filled with insulation 66, and begins to flow out of the small vent openings 58 near the top edge 48 of the bag, the bag injection process is stopped. The density of the foam 66 within the insulation-filled bag 42, quite desirably, is substantially uniform from the bottom of the bag 42 to the top thereof, thereby correspondingly increasing the overall thermal insulation efficiency of the insulation-filled bag 42.

The filling of the bag 42 with the insulation 66 expands the bag 42 in a forward direction (as may be seen by comparing FIGS. 4 and 4A) to cause the filled bag 42 to come into forcible sealing contact with the outer side surface of the tank 14 and the interior surface of the jacket 28 (see FIG. 2) to thereby wall off the thermostats 34 and the drain fitting 24 (or their installation locations if they are subsequently mounted) from the balance of the insulation cavity 26.

The pressurized filling of the bag 42 with the injected foam insulation 66 also causes the insulation 66 to ooze outwardly in small quantities through the diminutive metering openings 60 in the bag 42 (which, as the bag is expanded by the foam 66, are re-oriented so that they face generally parallel to the front and rear bag side walls 44,46 as shown in FIG. 4A). The metering openings 60 are substantially smaller in cross-section than the vent openings 58. After the bag 42 is filled with the insulation 66, the injected insulation 66 is permitted to harden. The very small portions of the insulation 66 which oozed out of the metering openings 60 during the pressurized insulation injection of the bag harden to form a series of mutually spaced apart, generally knob-shaped locking protrusions 68 on what are now the expanded vertical side edge portions of the bag 42 which circumferentially face the balance of portion of the insulation cavity 26 which horizontally extends around the tank 14.

After the insulation 66 in the bag 42, and the resulting exterior insulation protrusions 68 harden, the previously mentioned batch of insulation 40 is injected into the tank/jacket cavity 26 and allowed to harden. Due to the prior placement in the cavity 26 of the bag-based foam dam structure 12, substantially none of the injected foam insulation 40 enters the bag openings 62 and 64, contacts either of the thermostats 34 or the drain fitting 38, or escapes outwardly through any of the jacket openings 35 or 38. When the insulation 40 subsequently hardens, it becomes mechanically interlocked, as at locations 70 that may be best seen in FIG. 7, with the various hardened insulation protrusions 68 spaced apart along the expanded vertical side edges of the in-place bag 42.

This mechanical interlock between the insulation 40 and the completed foam dam structure 12 substantially prevents the pulling away of the insulation 40 from the vertical bag side edges as the insulation 40 shrinks during its post-injection hardening. There is thus no appreciable gap created between the hardened insulation 40 and the expanded vertical side edges of the bag 42 (see FIG. 7) for tank heat to leak outwardly through. Thus, the overall heating efficiency of the water heater 10 is appreciably and economically improved in a unique and simple manner.

Figure 5:
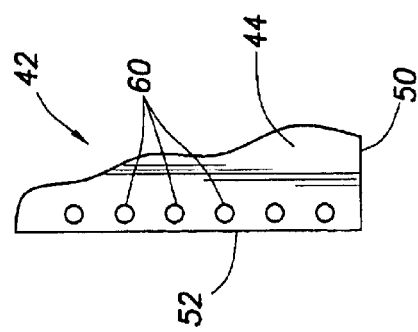
FIG. 5 is an enlarged scale detail view of the dashed area "5" in FIG. 3 and illustrates a portion of the insulation metering holes formed in the plastic bag.
Figure 5A:
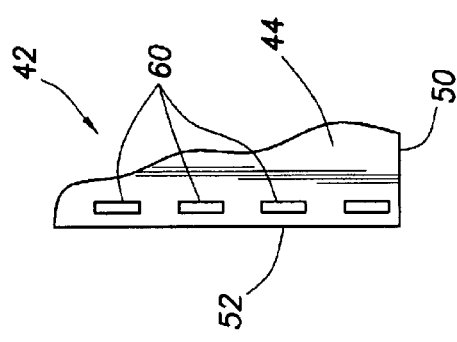
FIGS. 5A and 5B are detail views similar to that in FIG. 5 but illustrating representative alternate patterns for the metering holes.
Figure 5B:
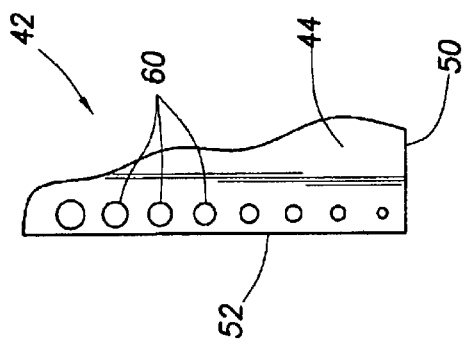
Figure 6:
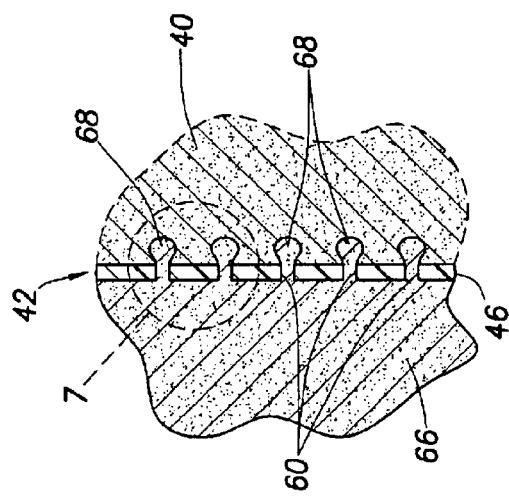
FIG. 6 is an enlarged scale schematic cross-sectional view taken along line 6—6 through a portion the foam insulation-filled bag of FIG. 4A and illustrating the unique mechanical interlock between insulation injected into the bag and another body of hardened foam insulation within the water heater.

Representatively, as shown in FIG. 5, the cross-sectional areas of the pinhole metering openings 60 are substantially uniform, and each of the openings 60 has a circular cross-section. Alternatively, the metering openings 60 may have other shapes such as, for example, the vertical elongated slot configurations shown in FIG. 5A. Another modification which can be made to the configurations of the metering openings 60 is shown in FIG. 5B in which the cross-sectional areas of the representatively round metering openings 60 increase vertically along the opposite vertical side edges 52,54 of the bag 42 so that the cross-sectional areas of upper ones of the openings 60 are greater than the cross-sectional areas of lower ones of the openings 60. Such increase in the metering opening areas vertically along the bag 42 has been found to further increase the desirable insulation density uniformity vertically along the interior of the bag 42.

Illustrated in simplified form in FIGS. 8–9A is a representative alternate embodiment 42a of the previously described plastic foam dam bag 42. To facilitate comparison between the two bag embodiments 42 and 42a, features in the bag 42a similar to those in the bag 42 have been given identical reference numerals with the subscripts "a".

In the bag 42a, the vent openings 58a are formed by clipping off small top corner portions of the bag, and the thermostat openings 62a have vertically elongated, generally hourglass shapes with concave vertical sides 72 (see FIG. 8). When the bag 42a is filled with foam 66, opening sides 72 generally straighten to their dotted line positions so that the resulting shapes of the openings 62a are more rectangular to more closely conform to the rectangular shapes of the thermostats 34 they receive.

The left and right side vertical side edge portions 74,76 of the bag 42a have pleated configurations which expand in a forward direction in response to filling the bag 42a with foam insulation 66 (compare the empty bag configuration in FIG. 9 to the insulation-filled bag configuration in FIG. 9A) to increase the bag's sealing contact area around the thermostats 34 and the drain fitting 24. The metering openings 60a are formed in the pleated side edge portions 74,76, and when the foam insulation 66 is injected into the bag 42a and allowed to harden, the locking projections 68a are formed exteriorly along the pleated side edge portions 74,76 for mechanically interlocking with the subsequently injected batch of insulation foam 40 within the remainder of the insulation cavity 26 and preventing undesirable separation of such insulation 40 from the bag 42a.

While the previously described fabrication and insulation technique has been representatively utilized in an electric water heater, those of skill in this particular art will readily appreciate that it could also be advantageously employed in a variety of other tank insulating applications, such as with boilers or gas-fired water heaters, without departing from principles of the present invention.

The foregoing detailed description is to be clearly understood as being given by way of illustration and example only, the spirit and scope of the present invention being limited solely by the appended claims.

What is claimed is:

1. A method of insulating a tank, comprising the steps of:
    placing an outer jacket on the tank to define a cavity extending outwardly around a portion of the tank;
    positioning a flexible bag in a first portion of said cavity, said bag having a spaced series of metering openings in a wall portion thereof;
    forcing a first quantity of flowable, hardenable insulation into said bag in a manner expanding said bag into sealing engagement with said tank and said outer jacket, and causing a small portion of said insulation to be forced outwardly through said metering openings and subsequently form spaced apart hardened external protrusions on said bag;

flowing a second quantity of flowable, hardenable insulation into a second portion of said cavity and into contact with said wall portion of said bag and the hardened protrusions thereon; and permitting said second quantity of insulation to harden and become mechanically interlocked with the previously hardened insulation protrusions in a manner substantially preventing shrinkage-created separation of said second insulation quantity from said wall portion of said bag.

2. The method of claim 1 wherein:

said forcing and flowing steps are performed using a liquid foam insulation material.

3. The method of claim 1 wherein:

said positioning step is performed using a plastic bag.

4. The method of claim 1 wherein:

said forcing step is performed in a manner providing said protrusions with surface areas spaced apart from and generally facing said wall portion of said bag.

5. The method of claim 1 wherein:

said flexible bag has a substantially closed upper end portion with a relatively small injection opening and associated vent opening area therein, and said forcing step is performed by injecting a liquid foam insulation material through said injection opening in a manner causing the injected foam insulation material to be packed under pressure within said bag and thus enhance the top-to-bottom insulation density uniformity in the bag subsequent to said forcing step.

6. The method of claim 5 wherein:

said bag has an upper edge, and said method further comprises the step of disposing said vent opening area adjacent said upper edge.

7. The method of claim 6 wherein:

said disposing step is performed by forming in a wall portion of said bag a spaced series of vent holes inwardly adjacent and generally parallel to said upper edge.

8. The method of claim 6 wherein:

said bag has corner portions at opposite ends of said upper edge, and said disposing step is performed by extending vent openings through said corner portions.

9. The method of claim 1 wherein:

said bag has an upper end extending between opposite vertical side edge portions, and said method further comprises the step of arranging said metering openings in vertically spaced series along said vertical side edge portions.

10. The method of claim 9 further comprising the step of:

configuring said metering openings to have cross-sectional areas which increase upwardly along the lengths of said vertical side edge portions.

11. The method of claim 9 wherein:

said opposite side edge portions include opposite front and rear side wall portions of said bag, and said arranging step includes the step of extending said metering openings through said opposite front and rear side wall portions of said bag.

12. The method of claim 9 wherein:

said vertical side edge portions of said bag include pleated areas of said bag, and said arranging step includes the step of extending said metering openings through said pleated areas.

13. Insulated tank apparatus comprising:

a tank;

a jacket extending outwardly around said tank and defining a cavity between said jacket and said tank;

a flexible bag disposed in a first portion of said cavity in sealing engagement with facing portions of said tank and said jacket, said bag having wall openings therein that face a second portion of said cavity;

a first quantity of hardened insulation material disposed in said bag, a small portion of said hardened insulation material projecting outwardly through said wall openings defining spaced apart locking protrusions on the external surface of said bag; and a second quantity of hardened insulation material placed in a second portion of said cavity after the hardening of said first insulation quantity and mechanically interlocked with said locking protrusions.

14. The insulated tank apparatus of claim 13 wherein:

said locking protrusions are generally knob-shaped and have surface portions spaced apart from and generally facing said bag, and said second quantity of hardened insulation material abuts said surface portions.

15. The insulated tank apparatus of claim 13 wherein:

said tank is a water heater storage tank.

16. The insulated tank apparatus of claim 13 wherein:

said first and second quantities of hardened insulation material are hardened liquid foam insulation material.

17. The insulated tank apparatus of claim 13 wherein:

said bag is of a plastic material.

18. The insulated tank apparatus of claim 13 wherein:

said bag has a substantially closed upper end portion with a relatively small insulation injection opening therein.

19. The insulated tank apparatus of claim 18 wherein:

said bag further has at least one vent opening adjacent said injection opening.

20. The insulated tank apparatus of claim 18 wherein:

said bag has an upper end edge through which said insulation injection opening extends, and further has a plurality of vent openings downwardly adjacent and spaced apart in a direction parallel to said upper end edge.

21. The insulated tank apparatus of claim 18 wherein:

said bag has opposite upper corner edge portions through which vent openings extend.

22. The insulated tank apparatus of claim 13 wherein:

said bag has an upper end extending between opposite vertical side edge portions, and said wall openings are arranged in vertically spaced series along said vertical side edge portions.

23. The insulated tank apparatus of claim 22 wherein:

said wall openings have cross-sectional areas which increase upwardly along the lengths of said vertical side edge portions.

24. The insulated tank apparatus of claim 22 wherein:

said opposite side edge portions include opposite front and rear side wall portions of said bag, and said wall openings extend through said opposite front and rear side wall portions of said bag.

25. The insulated tank apparatus of claim 22 wherein:

said vertical side edge portions of said bag include pleated areas of said bag, and said wall openings extend through said pleated areas.

26. A water heater comprising:

a tank adapted to hold a quantity of water and having a vertically extending side wall portion;

heating apparatus for heating water disposed in said tank;

a jacket extending outwardly around said side wall portion and defining a cavity between said jacket and said tank, said jacket having an opening therein;

a water heater component extending outwardly from said tank toward said access opening;

a foam dam disposed within a first portion of said cavity and sealingly circumscribing said component, said foam dam including:

an apertured flexible bag in expanded, sealing engagement with facing portions of said tank and said jacket circumscribing said component, said bag having wall openings therein that face a second portion of said cavity; and a first quantity of hardened liquid foam insulation material disposed in said bag, a small portion of said hardened insulation material projecting outwardly through said wall openings and defining spaced apart locking protrusions on the external surface of said bag; and a second quantity of hardened liquid foam insulation material placed in a second portion of said cavity after the hardening of said first insulation quantity and mechanically interlocked with said locking protrusions.

27. The water heater of claim 26 wherein:

said water heater is an electric water heater.

28. The water heater of claim 27 wherein:

said heating apparatus includes an electric resistance heating element extending inwardly from said water heater component into said tank.

29. The water heater of claim 28 wherein:

said water heater component is a thermostatic control component.

30. The water heater of claim 26 wherein:

the density of said first quantity of hardened liquid foam insulation in said bag is substantially uniform along the vertical dimension of said bag.

31. The water heater of claim 26 wherein:

said bag has opposite vertical side edge portions, and said wall openings are vertically spaced apart along said side edge portions.

32. The water heater of claim 31 wherein:

the cross-sectional areas of said wall openings increase upwardly along the lengths of said vertical side edge portions.

33. The water heater of claim 26 wherein:

said bag has opposite pleated vertical side edge portions.

34. The water heater of claim 26 wherein:

said bag has a substantially closed upper end portion through which a relatively small insulation injection opening extends.

35. The water heater of claim 34 wherein:

said bag further has at least one vent opening adjacent said insulation injection opening.

36. The water heater of claim 26 wherein:

said locking protrusions are generally knob-shaped and have surface portions spaced apart from and generally facing said bag, said surface portions abutting surface portions of said second quantity of hardened liquid foam insulation.

37. The water heater of claim 26 wherein:

said water heater component extends through an aperture in said bag having, prior to expansion of said bag by the insulation therein, has generally concave opposite sides which are materially straightened when said bag is brought into said expanded sealing engagement with facing portions of said tank and said jacket.

38. A method of insulating a tank, comprising the steps of:

placing an outer jacket on the tank to define a cavity extending outwardly around a portion of the tank;

positioning a flexible bag in a first portion of said cavity, said flexible bag having a substantially closed upper end portion with a relatively small injection opening and associated vent opening area therein;

forcing a first quantity of flowable, hardenable insulation into said bag through said injection opening in a manner expanding said bag into sealing engagement with said tank and said outer jacket and causing said first quantity of insulation to be packed under pressure within said bag and thus enhance the top-to-bottom insulation density uniformity in said bag subsequent to said forcing step; and flowing a second quantity of flowable, hardenable insulation into a second portion of said cavity and into contact with said bag.

39. The method of claim 38 wherein:

said forcing and flowing steps are performed using a liquid foam insulation material.

40. The method of claim 38 wherein:

said positioning step is performed using a plastic bag.

41. The method of claim 38 wherein:

said bag has an upper edge, and said method further comprises the step of disposing said vent opening area adjacent said upper edge.

42. The method of claim 41 wherein:

said disposing step is performed by forming in a wall portion of said bag a spaced series of vent holes inwardly adjacent and generally parallel to said upper edge.

43. The method of claim 41 wherein:

said bag has corner portions at opposite ends of said upper edge, and said disposing step is performed by extending vent openings through said corner portions.

* * * * *